(12) United States Patent
Standefer et al.

(10) Patent No.: US 10,552,218 B2
(45) Date of Patent: Feb. 4, 2020

(54) DYNAMIC CONTEXT OF TASKS

(71) Applicant: Microsoft Technology Licensing, LLC, Redmond, WA (US)

(72) Inventors: Robert Standefer, Duvall, WA (US); Christopher L. Mullins, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 15/400,744

(22) Filed: Jan. 6, 2017

(65) Prior Publication Data
US 2018/0196697 A1     Jul. 12, 2018

(51) Int. Cl.
| | |
|---|---|
| *G06F 9/46* | (2006.01) |
| *G06F 9/50* | (2006.01) |
| *G06Q 10/06* | (2012.01) |
| *G06F 3/0484* | (2013.01) |
| *H04L 29/06* | (2006.01) |

(52) U.S. Cl.
CPC ....... *G06F 9/50* (2013.01); *G06Q 10/063112* (2013.01); *G06F 3/04842* (2013.01); *H04L 67/42* (2013.01)

(58) Field of Classification Search
USPC .......................................... 718/104
See application file for complete search history.

(56) References Cited

U.S. PATENT DOCUMENTS

| | | | | |
|---|---|---|---|---|
| 6,138,118 A | * | 10/2000 | Koppstein | ............... G06F 9/466 |
| 8,059,812 B1 | * | 11/2011 | Bundy | ................ H04M 3/5237 |
| | | | | 379/265.02 |
| 2003/0084143 A1 | * | 5/2003 | Knoesel | ............. G06F 17/3089 |
| | | | | 709/224 |
| 2004/0230685 A1 | * | 11/2004 | Seligmann | ............. G01C 21/00 |
| | | | | 709/228 |

(Continued)

FOREIGN PATENT DOCUMENTS

WO     2015091040 A1     6/2015

OTHER PUBLICATIONS

Kersten, et al., "Using task context to improve programmer productivity", In Proceedings of 14th ACM SIGSOFT International Symposium on Foundations of Software Engineering, Nov. 5, 2006, pp. 1-11.

(Continued)

*Primary Examiner* — Mehran Kamran
(74) *Attorney, Agent, or Firm* — Merchant & Gould

(57) ABSTRACT

In non-limiting examples of the present disclosure, systems, methods and devices for linking tasks and resources are provided. A plurality of attributes associated with a task resource may be analyzed. A plurality of contexts that are associated with the plurality of attributes may be determined and the plurality of attributes may be classified into one or more contextual groups. At least one resource node related to the task resource may be identified, the at least one resource node having a plurality of identified attributes sharing at least two contexts associated with the plurality of attributes that are associated with the task resource. An actionable link to at least one resource corresponding to the at least one identified resource may be displayed.

20 Claims, 14 Drawing Sheets

(56) References Cited

U.S. PATENT DOCUMENTS

| | | | | |
|---|---|---|---|---|
| 2005/0192822 A1* | 9/2005 | Hartenstein | G06Q 10/109 | 705/319 |
| 2006/0156252 A1* | 7/2006 | Sheshagiri | H04L 12/2803 | 715/825 |
| 2009/0089552 A1* | 4/2009 | Inchingolo | G06Q 10/06 | 712/216 |
| 2009/0240546 A1* | 9/2009 | Sato | G06Q 10/06 | 705/7.27 |
| 2009/0320037 A1* | 12/2009 | Gokhale | G06F 9/5016 | 718/104 |
| 2010/0305730 A1* | 12/2010 | Glitsch | G06F 17/30026 | 700/94 |
| 2011/0258252 A1* | 10/2011 | Torres Ramon | G06Q 10/06 | 709/203 |
| 2011/0289041 A1* | 11/2011 | Hunt | G06Q 10/06311 | 706/50 |
| 2011/0314375 A1* | 12/2011 | Zaika | G06F 3/0482 | 715/708 |
| 2012/0130915 A1* | 5/2012 | Diaz | G06Q 10/06 | 705/321 |
| 2013/0091453 A1* | 4/2013 | Kotler | G06Q 10/0631 | 715/772 |
| 2013/0159377 A1* | 6/2013 | Nash | H04L 67/00 | 709/202 |
| 2013/0332214 A1* | 12/2013 | George | G06Q 10/063114 | 705/7.15 |
| 2013/0339831 A1* | 12/2013 | Gulanikar | G06Q 10/063114 | 715/210 |
| 2014/0173602 A1* | 6/2014 | Kikin-Gil | G06Q 10/109 | 718/100 |
| 2014/0279790 A1* | 9/2014 | Ramachandran | G06N 7/005 | 706/46 |
| 2015/0043726 A1* | 2/2015 | Steiner | H04M 3/5233 | 379/265.12 |
| 2015/0067171 A1* | 3/2015 | Yum | G06F 9/5072 | 709/226 |
| 2015/0100503 A1* | 4/2015 | Lobo | G06Q 10/103 | 705/301 |
| 2015/0120577 A1* | 4/2015 | Lobo | G06Q 10/103 | 705/301 |
| 2015/0295877 A1* | 10/2015 | Roman | H04W 4/029 | 709/203 |
| 2015/0339169 A1* | 11/2015 | Siddiqui | G06F 9/46 | 718/104 |
| 2016/0100019 A1* | 4/2016 | Leondires | G06F 21/6218 | 709/204 |
| 2016/0161280 A1* | 6/2016 | Shahine | G06Q 10/06 | 701/516 |
| 2016/0162148 A1* | 6/2016 | Murphy | G06F 3/04842 | 715/863 |
| 2016/0224939 A1* | 8/2016 | Chen | G06Q 10/107 | |
| 2016/0300024 A1* | 10/2016 | Janssen | G06Q 10/06 | |
| 2016/0378569 A1* | 12/2016 | Ristock | G06F 9/5083 | 718/104 |

OTHER PUBLICATIONS

"International Search Report and Written Opinion Issued in PCT Application No. PCT/US2018/012285", dated Mar. 6, 2018, 12 Pages.

* cited by examiner

DYNAMIC CONTEXT OF TASKS

BACKGROUND

Tasks are often assigned with little thought to what information may be needed by a task assignee to complete a task in accordance with the task assignor's intent. Such tasks are often assigned by providing instructions in an email, comments in a document, or other electronic means. When tasks are assigned without sufficient context, task assignees must try to manually identify the relevant contextual information that they will need to complete those tasks by emailing the task assignor for more information, manually sorting through documents and other resources they believe may be relevant to the task, or a combination of those strategies. In practice, these strategies are time consuming and often lead to misunderstandings regarding the scope of an assigned task, ultimately leading to a task that is not completed according to the task assignor's intent.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Non-limiting examples of the present disclosure describe systems, methods and devices for dynamically linking tasks and resources. According to examples, a task may be assigned to one or more task assignees via a task assignment resource. The task assignment resource and its corresponding properties may be analyzed for classification into one or more classification groups. Such classification groups may include an associated party's context group, a locational context group, a temporal context group, and a topical context group. Based on the classification, one or more resource nodes, and their corresponding attributes, may be analyzed for their contextual relationship to the assigned task. Resource nodes that are determined to having a plurality of identified attributes that each share at least two classification groups with the task assignment classification may be identified. Contextual information describing the relationships of the identified resource nodes (and their corresponding resources) to the assigned task may be displayed, and a link to each of those resources may be provided to a task assignee via a graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
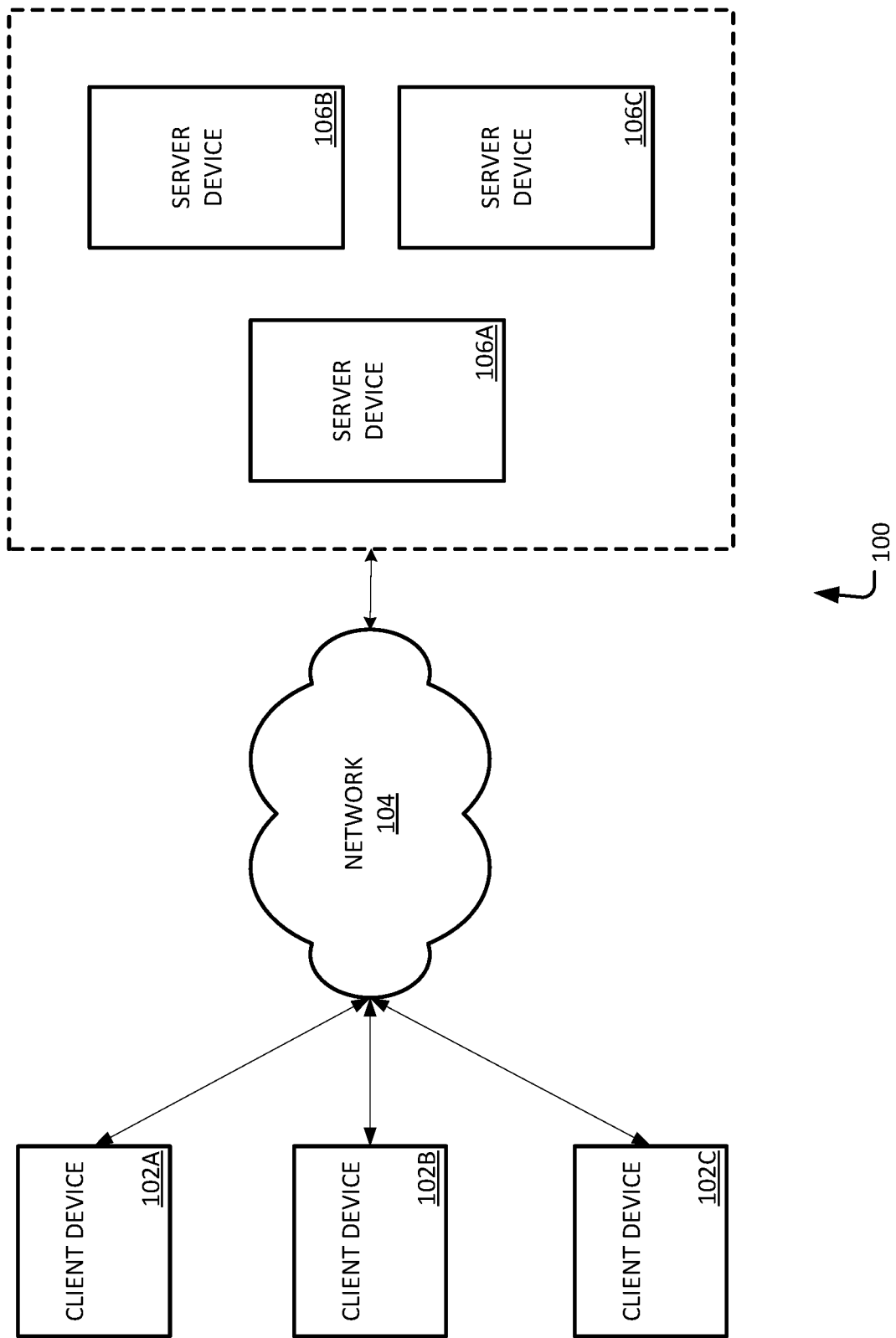
FIG. 1 illustrates an overview of an example system for dynamically linking tasks and resources.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for dynamically linking tasks and resources. Tasks and task assignment may take various forms such as: edit media A (e.g., a document, an audio file, an image, a video file, etc.), edit a specific portion of media A, review media A in preparation for a subsequent task, book a ticket, author new media related to B, send an email to parties C, D and E, book a reservation for event F, perform an action when conditions G, H and I have occurred, perform an action when conditions G, H and I occur contemporaneously, etc. Tasks are often assigned by one or more individuals and/or groups (task assignors) to one or more individuals and/or groups (task assignees) in manners that provide minimal information regarding the context of the tasks. For example, a task assignee may receive an email or other electronic notification that explains what the assigned task they are to perform is (e.g., update a section of a document), but receive little or no information regarding the context of the task assignment. That is, a task assignee may not sufficiently understand the scope of a task because they do not understand the reason the task was assigned, what individuals were associated with the task being created, what individuals were associated with the decision to assign the task to the task assignee, who will review the completed task, what the purpose of the task is, etc. Thus, in order to adequately complete the task, a task assignee may need to attempt to piece this information together manually by performing steps such as emailing the task assignor with questions regarding the context of the task, locate relevant media as it relates to the task, and a combination of the two.

According to aspects of the current disclosure a task resource (e.g., an email that provides assignment of a task, an electronic notification that provides assignment of a task, a document that includes comments from a task assignor, etc.) may be analyzed, along with various properties associated with the resource, and a task node may be created for that task. According to examples, a plurality of properties associated with a task resource may be categorized into one or more context groups including: an associated parties context group, a locational context group, a temporal context group, and a topical context group.

A task resource and/or one or more of its associated attributes (as they relate to a node created for the task resource) may be categorized in the associated parties context group based on identification of one or more individuals and/or contacts that sent a task resource (e.g., a task assignment document) to the task assignee, one or more individuals and/or contacts being mentioned in the task resource or a secondary resource that accompanied the task resource, and/or one or more individuals and/or contacts being carbon copied when the task resource was sent, etc.

A task resource and/or one or more of its associated attributes (as they relate to a node created for the task resource) may be categorized in the locational context group based on a determination that a task resource was sent from a specific geolocation, that one or more persons associated with the sending of the task resource are affiliated with a specific geolocation (e.g., a manager that sent a task assignment resource is based in Redmond, Wash.), that a meeting related to the task assignment took place at a specific geolocation, etc.

A task resource and/or one or more of its associated attributes (as they relate to a node created for the task resource) may be categorized in the temporal context group based on a determination that a task resource was sent at a specific time, that the specific time that a task resource was sent is within a threshold timeframe from a determined time that a meeting involving the task took place, persons carbon copied on a task assignment notification and/or the task assignee, etc. Temporal data including metadata associated with a task resource may be analyzed and processed in determining whether a task assignment resource is to be categorized in the temporal context group. For example, a task resource such as an email may include a time stamp when it is sent. In addition to metadata, optical character recognition processing may be implemented to extract date and time information from a task resource and determinations may be made that processed character information from that resource corresponds to a date and time such that the task resource may be categorized in the temporal context group.

A task resource and/or one or more of its associated attributes (as they relate to a node created for the task resource) may be categorized in the topical context group based on a determination that a task resource and/or associated content (e.g., attachments included with a task resource) with a task resource include one or more keywords or descriptors (e.g., company project number) that correspond to a specific task or task type, a specific project name or project type, a specific topic or topic type, etc. Such classification may be performed utilizing language processing models to identify keywords and phrases relating to one or more topical context groups as well as machine learning and classification in identifying relevant topical context groups that analyzed attributes should be classified in. Machine learning in the classification of attributes may be implemented (e.g., convolutional neural networks) in identifying relationships from previously classified attributes that may be used to supplement identification and subsequent classification of attributes for newly created nodes and/or the reclassification of attributes for existing nodes. It should be understood that there may be a number of classifications into the topical context group based on analysis of a single task resource (or a corresponding task node and its attributes) and that weights may be assigned to each of those classifications. For example, weighting of contextual classifications may be based on a variety of factors in order to provide most relevant content, as it relates to a task, to task assignees. For example, text extracted from a subject line in a task assignment email may be weighted more heavily than text extracted from the body of the email.

In creating a node from a processed task resource, one or more attributes may be associated with the created node, which indicate that the task resource is associated with one or more determined context groups based on context categorization as described above. For example, if a task assignment resource is assigned to a temporal context group attributes such as: "has temporal context" as well as more detailed attributes such as "has creation date: year: 2016, month: December, day: 12, time 13:22" may be associated with a task assignment resource as attributes.

Based on the classification of a task resource and/or its associated properties into context groups, one or more attributes of nodes potentially related to the task assignment resource may be analyzed to determine their relationship to an assigned task. For example, a first resource may have been previously, contemporaneously, or subsequently analyzed and one or more properties of that resource may have been classified in a contextual group corresponding to an associated parties context group, a locational context group, a temporal context group and/or a topical context group. Those classifications may be stored and associated with one or more nodes potentially related to the task resource. Such classification may be performed in the same manner as described above with regard to context group classification of task resources and their corresponding properties.

According to examples, determinations may be made regarding whether a task node and its attribute classifications are related to one or more additional nodes based on having shared attribute classifications. For example, attributes of potentially task related resource nodes that have been classified in a same contextual classification group as classified attributes of a task assignment resource may be identified and a weight may be applied to those classifications such that matched nodes (based on shared attribute classification) are more likely to correspond to relevant contextual information that may be provided to a task assignee as reference for completing an assigned task. For example, if more than one attribute of a potentially task related node has been classified in the same contextual classification group as a task resource node, that potentially task related node may be weighted more heavily. Similarly, if one or more attributes of a potentially task related node are classified into a plurality of contextual groups corresponding to classifications for a task resource node, that potentially task related node may be weighted more heavily than nodes that do not have attributes that have been classified in shared contextual categories with a task resource node.

Contextual information describing the relationships of identified resource nodes (and their corresponding resources) to an assigned task may be displayed, and a link to each of those resources may be provided to a task assignee via a graphical user interface. According to examples, potentially task related resources and their corresponding nodes may be ranked according to their contextual classification and match analysis to a task resource as described above. Relevant task related resources and/or links to those resources may be displayed, via a graphical user interface, such that they are arranged in a display pane within or adjacent to a task assignment resource (e.g., an email or document that a task was assigned from). In this manner, links to the highest ranked and most relevant resource(s) may be viewed alongside, and contemporaneously with, the task assignment resource. According to examples, when displaying relevant task resources, a separate window may be displayed in the task assigning resource, a popup window may be displayed when an indication is received to view relevant resources (e.g., a cursor is hovered over a task selection element in an application, a user clicks or otherwise selects an area of a task assignment resource, etc.), and a link may be provided in a window that directs to a corresponding resource.

Various different data structures may be employed to represent tasks and relationships between tasks and other entities or resources. For example, a linked list or a relational database may be used to store information about tasks. Alternatively, a graph, also referred to herein as a Set, may be used to represent various tasks and their relationships to other resources. Additional information regarding the creation and use of a Set will be provided below with respect to FIGS. 2 and 3.

FIG. 1 illustrates an overview of an example system 100 for dynamically linking tasks and resources. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 7-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
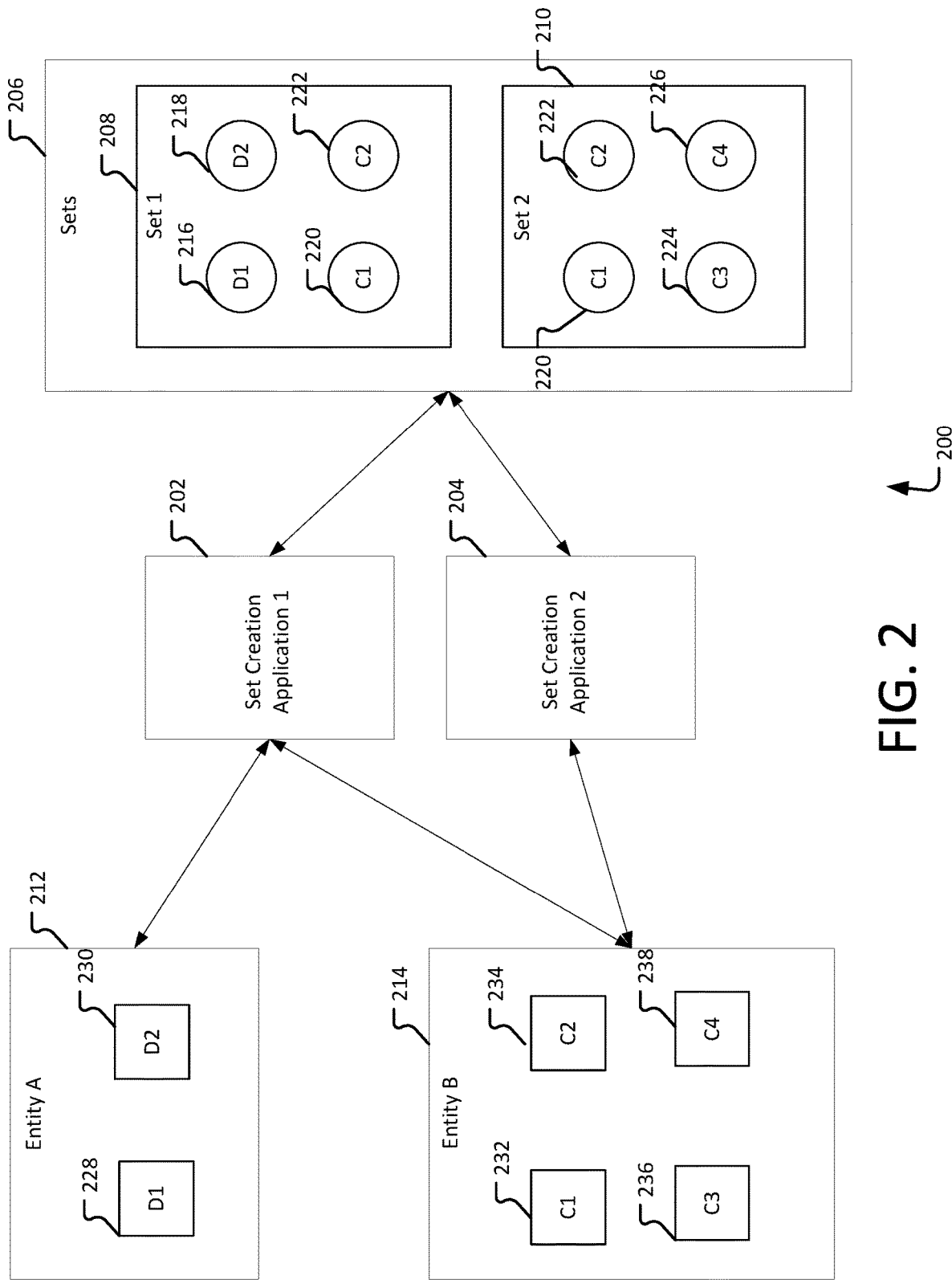
FIG. 2 illustrates an exemplary environment for Set creation from multiple entities having multiple resources.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rule sets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rule sets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
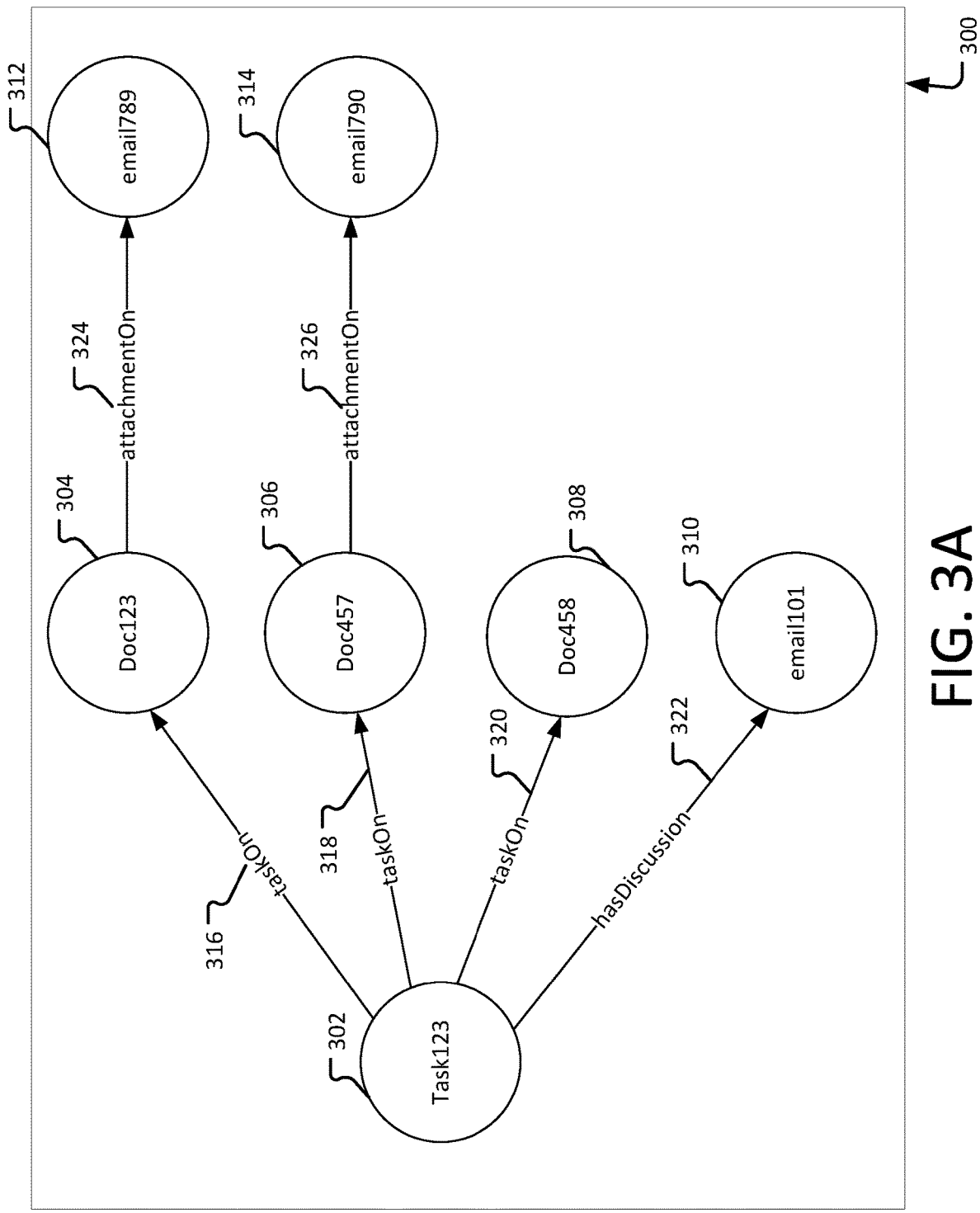
FIG. 3A illustrates an example isolated collection of asserted resource identifiers and corresponding relationships.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rule sets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationship, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
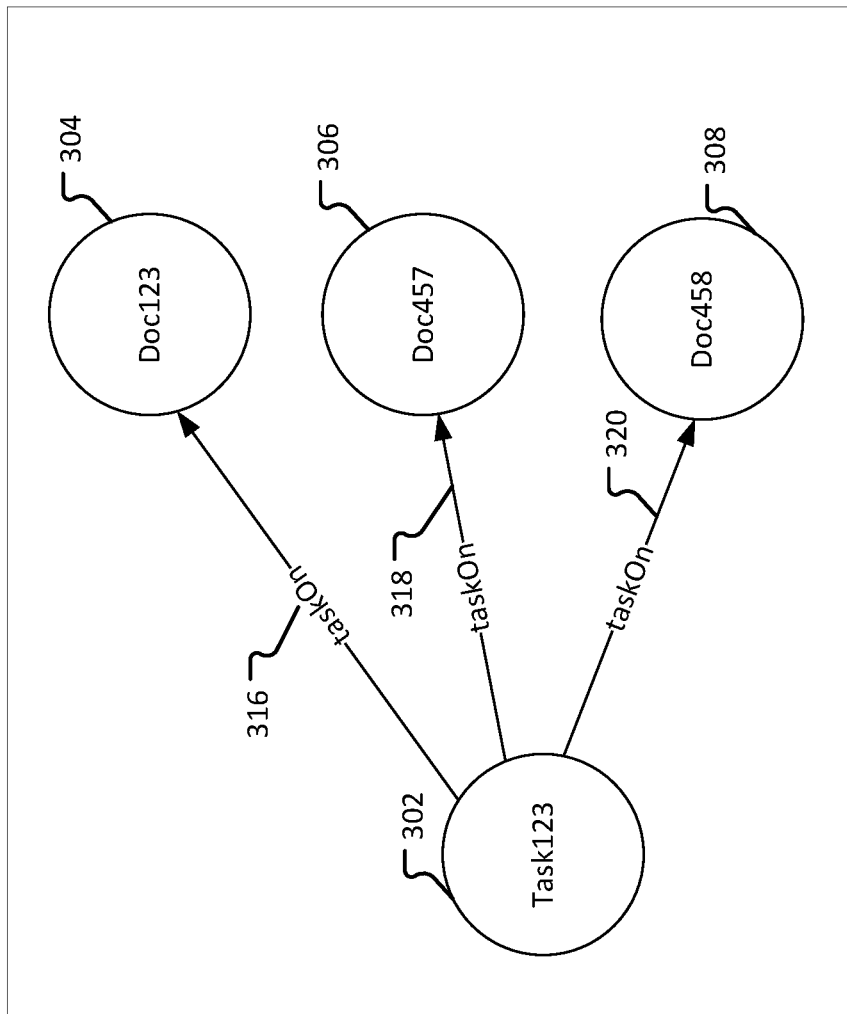
FIGS. 3B-3E illustrate an example query model that may be used to traverse a collection of nodes within a Set.
Figure 3B:
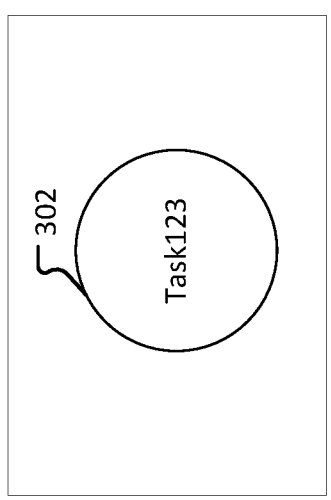
Figure 3D:
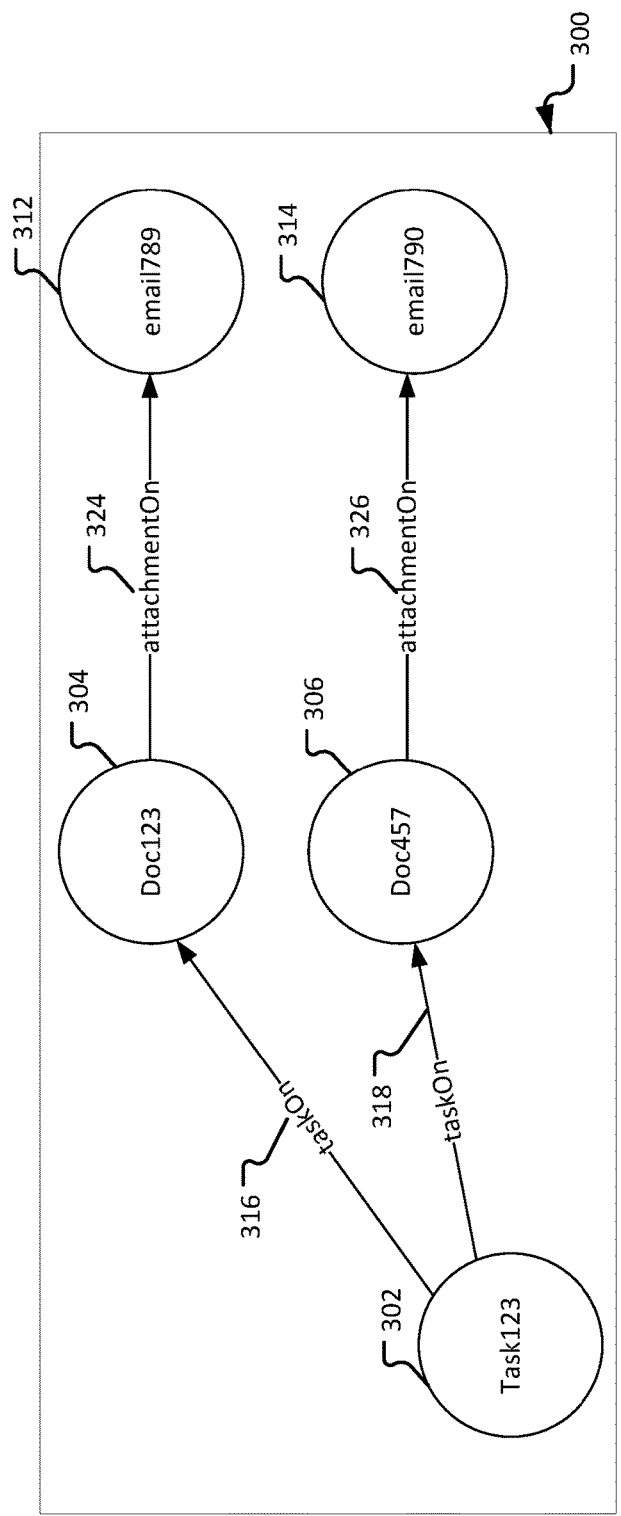
Figure 3E:
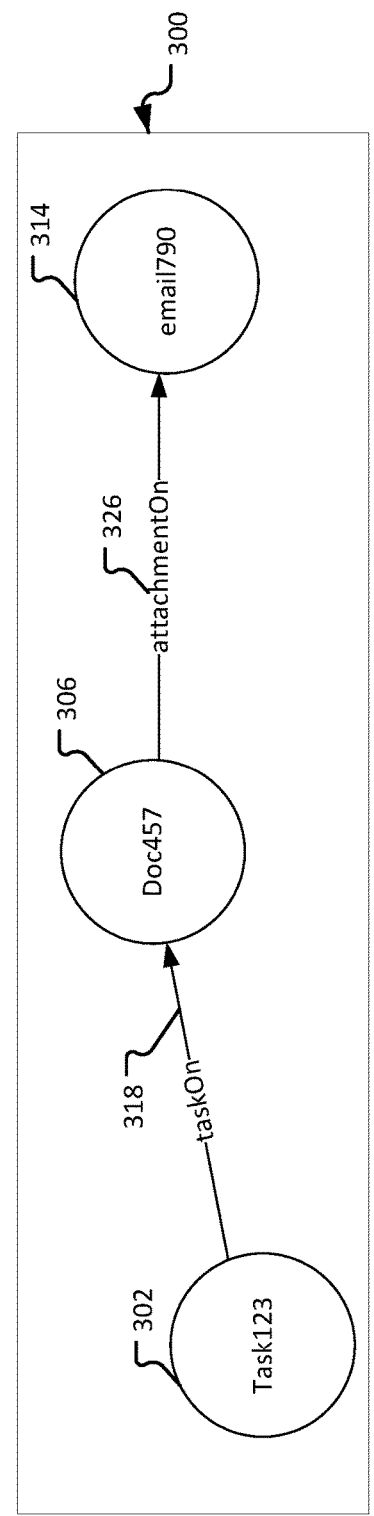

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to http:// . . . /collection300/task123?$expand=taskOn ($expand=attachmentOn($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
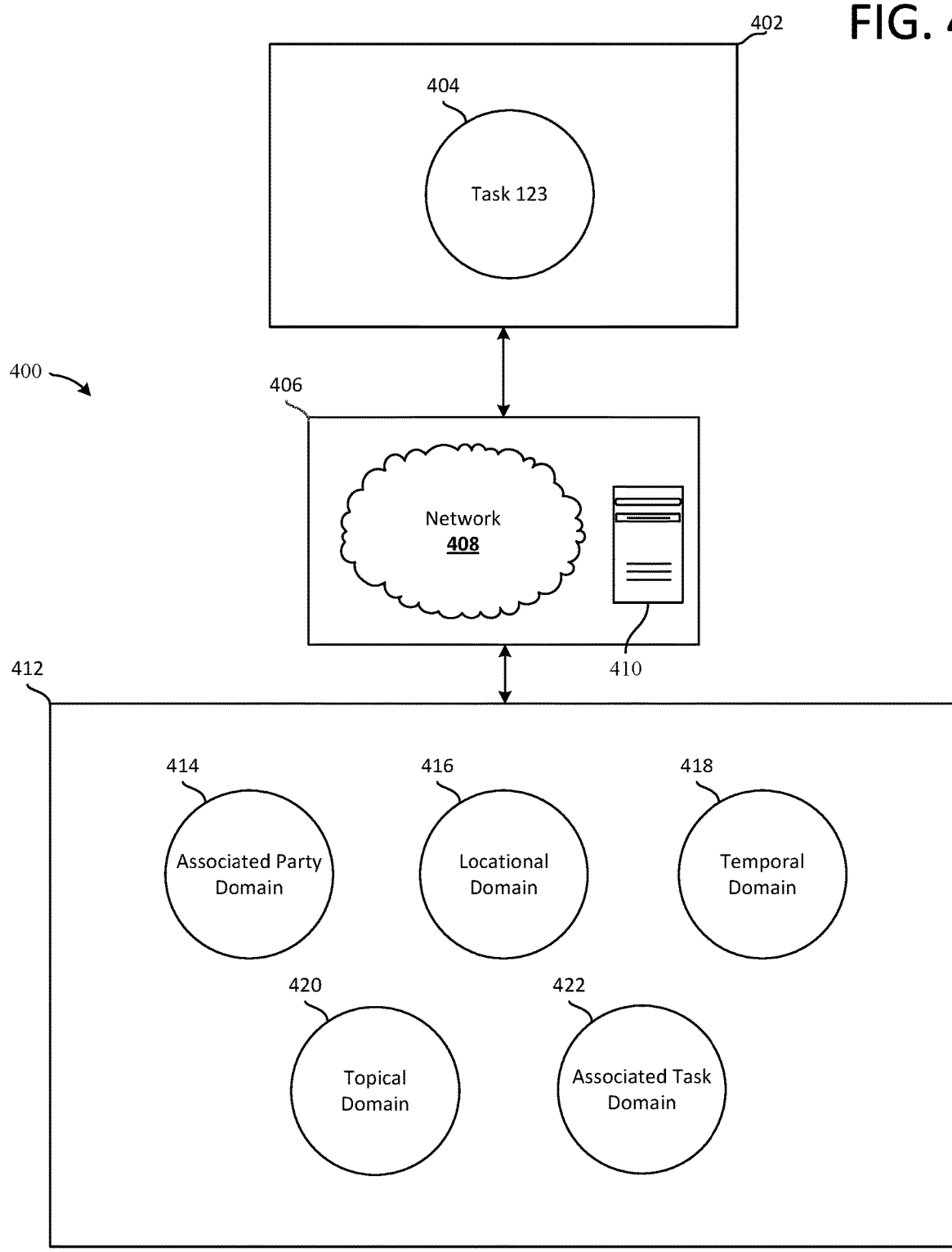
FIG. 4 illustrates an exemplary environment for dynamically linking tasks and resources.

FIG. 4 illustrates an exemplary environment 400 for dynamically linking tasks and resources. Environment 400 includes a task context 402 including task node 404, contextual processing context 406 including network 408 and server computing device 410, and domain context 412 including associated party domain 414, locational domain 416, temporal domain 418, topical domain 420 and associated task domain 422. Task node 404 is a resource identifier for a task resource (e.g., a task assignment resource) and may include one or more determined attributes as they relate to the resource's properties. The one or more determined attributes for task node 404 may include contextual attributes such as associated party attributes, locational attributes, temporal attributes, topical attributes and associated task attributes, each of which is associated with a corresponding property of a task resource. According to examples, one or more computing device, such as server computing device 410, may receive a task resource via network 408, analyze one or more properties of the task resource, classify one or more of those properties as relating to a task, classify one or more of those properties as relating to one or more of the above described contextual groups (i.e., associated party context group, locational context group, temporal context group, topical context group, associated task context group), and a node, such as task node 404 may be dynamically created and either added to an existing Set or a new Set may be created based on the creation of task node 404.

Upon creating task node 404 and associating attributes with it which have been classified into one or more of the above discussed contextual groups, determinations may be made in domain context 412 whether one or more nodes within the same Set and/or an alternate Set may be relevant to task node 404. Specifically, one or more nodes may be analyzed to determine whether they have attributes that are classified in a contextual group that overlaps with attributes of task node 404. Thus, potentially task related nodes may be analyzed for determinations as to whether they have attributes that are or may be classified according to an associated party domain 414, a locational domain 416, a temporal domain 418, a topical domain 420 and an associated task domain 422.

One or more attributes may be classified according to associated party domain 414 if their corresponding resource contains and/or is associated with data indicating the identity of one or more parties associated with it. For example, extracted information and metadata associated with a task assignment resource may indicate the author of the task assignment resource, parties present during the creation of the task assignment resource, parties present during a meeting at which a task associated with the task assignment resource was assigned, etc. Each one of these determined properties may be associated with a corresponding node attribute and classified according to associated party domain 414.

One or more attributes may be classified according to locational domain 416 if their corresponding resource contains and/or is associated with data indicating a geographic property associated with it. For example, extracted information and metadata associated with a task assignment resource may indicate a location where the task assignment resource was created, where the task assignment resource was sent from, where the task assignment resource was sent to, place information corresponding to locational coordinates associated with the task assignment resource (e.g., longitude and latitude coordinates may be converted to place locations such as specific places of business), locations of parties associated with the task assignment resource, etc. Each of these determined properties may be associated with a corresponding node attribute and classified according to the locational domain 416.

One or more attributes may be classified according to temporal domain 418 if their corresponding resource contains and/or is associated with data indicating a temporal property associated with it. For example, extracted information and metadata associated with a task assignment resource may indicate a time that the task assignment resource was created, times that the task assignment resource has been sent or otherwise accessed by other parties, schedules and availability of parties associated with the task assignment resource, etc. Each of these determined properties may be associated with a corresponding node attribute and classified according to the temporal domain 418.

One or more attributes may be classified according to topical domain 420 if their corresponding resource contains and/or is associated with data indicating topical information associated with it. For example, one or more language models may be run on extracted data contained in and/or associated with a task assignment resource and one or more keywords or phrases may be identified and categorized into a topical classification hierarchy. Upon making such classification, each classified property may be associated with a corresponding node attribute and classified according to the topical domain 420. According to further examples, one or more keywords or phrases that have been identified may be matched against a task corpus in determining whether a corresponding attribute likely corresponds to an associated task. For example, determinations may be made based on analysis of properties of a task assignment resource, that multiple tasks were assigned during a meeting in which the task assignment resource was created or sent to a task assignee, that one or more associated tasks related to a current task were performed prior to assignment of the current task, that one or more associated tasks related to the current task are to be performed subsequent to completion of the current task, etc. Upon making such a determination, each of those properties may be associated with a corresponding node attribute and classified in both the topical domain 420 and the associated task domain 422.

According to examples, each contextually categorized attribute may be weighted in making a determination of the relevance of its corresponding node to task node 404. For example, a determination may be made that shared associated party attributes should be weighted more heavily than shared locational attributes. Additionally, various combinations of shared attributes may be weighted based on the specific combination of those shared attributes. For example, a node that shares attribute classification with task node 404 in both the topical context group and the associated party context group may be weighted more heavily in a relevance calculation than a node that shares attribute classification with task node 404 in both the temporal domain and the locational domain. Upon determining the relevance of one or more nodes to task node 404, one or more relevant resources and/or links to resources corresponding to the one or more nodes may be displayed.

Figure 5:
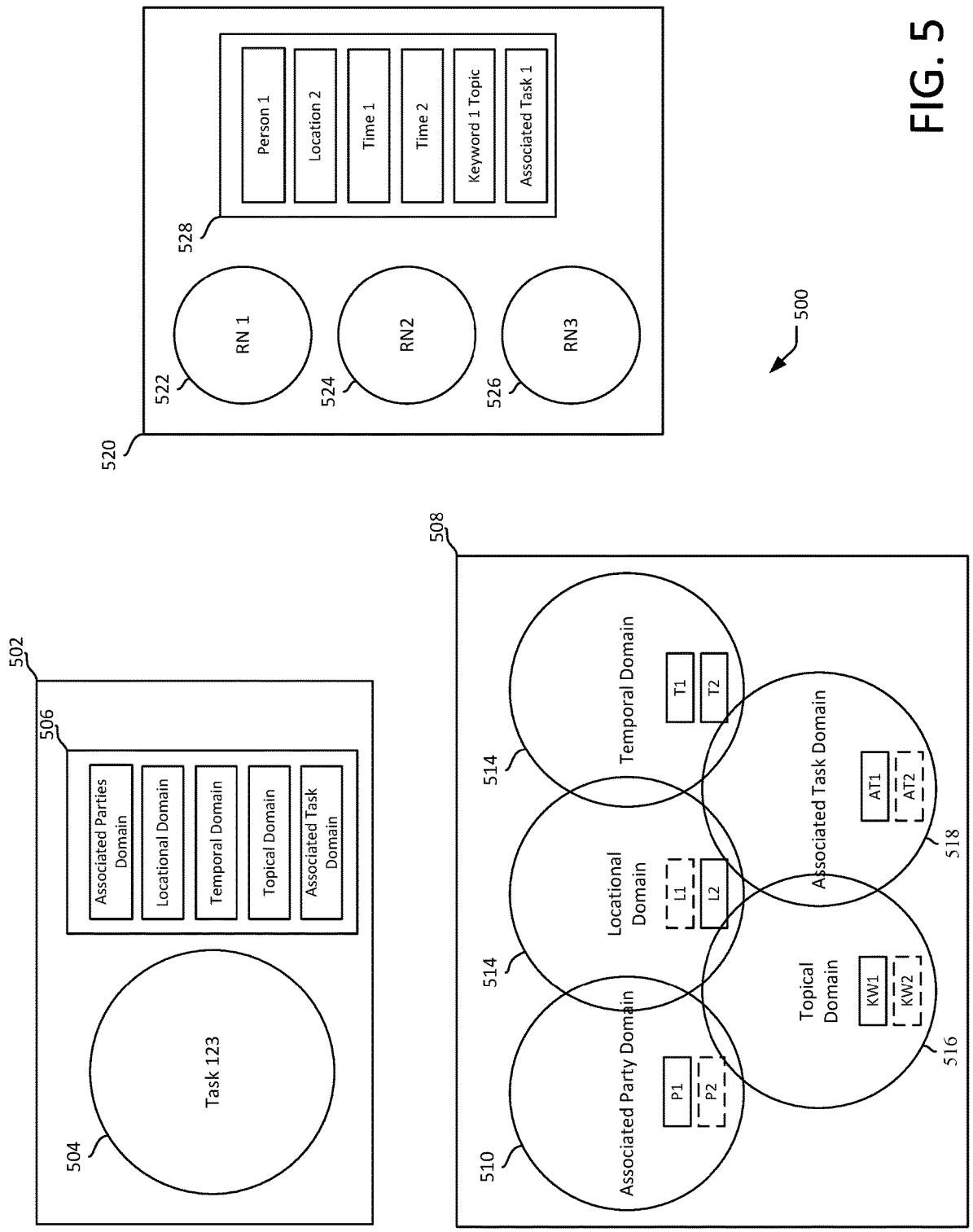
FIG. 5 illustrates individual contexts for classifying a task assigning resource into context groups, identifying nodes that have overlapping attributes with the task assigning resource, and contextually matching resources with an assigned task.

FIG. 5 illustrates exemplary environment 500 with individual contexts for classifying a task resource into context groups, identifying nodes that have shared attributes with a task resource, and contextually matching resources with an assigned task. Task resource classification context 502 includes task node 504 and identified attributes 506 corresponding to one or more properties of the task resource that task node 504 is representative of. Attributes 506 that have been associated with task node 504 include associated parties domain attributes, locational domain attributes, temporal domain attributes, topical domain attributes, and associated task domain attributes. Shared node attribute context 508 includes associated party domain 510, locational domain 514, temporal domain 514, topical domain 516 and associated task domain 518. Each of contextual domains 510-518, alone or in combination, may be representative of a single node or a plurality of nodes. For example, a single node or a plurality of nodes may be identified as being associated with one or more corresponding resource properties that have been classified in each of the contextual domains as illustrated. In the example shown in node attribute context 508, one or more nodes may have associated attributes that have been contextually classified into contextual domains 510-518. The contextually classified attributes are depicted in the rectangular boxes within each of contextual domains 510-518.

With regard to shared node attribute context 508, the one or more nodes may have two associated party attributes (Person 1 "P1" and Person 2 "P2") which have been classified in an associated party context group. However, only Person 1 is a shared attribute with task node 504 as indicated by the solid line surrounding "P1" in associated party domain 510. The one or more nodes may have two locational attributes (Location 1 "L1" and Location 2 "L2") which have been classified in a locational context group. However, only Location 2 is a shared attribute with task node 504 as indicated by the solid line surrounding "L2" in locational domain 514. The one or more nodes may have two temporal attributes (Time 1 "T1" and Time 2 "T2") which have been classified in a temporal context group, with both Time 1 and Time 2 being shared attributes with task node 504 as indicated by the solid lines surrounding both "T1" and "T2". The one or more nodes may have two topical attributes (Keyword 1 "KW1" and Keyword 2 "KW2") which have been classified in a topical context group. However, only Keyword 1 is a shared attribute with task node 504 as indicated by the solid line surrounding "KW1" in topical domain 516. The one or more nodes may also have two associated task attributes (Associated Task 1 "AT1" and Associated Task 2 "AT2") which have been classified in an associated task context group. However, only Associated Task 1 is a shared attribute with task node 504 as indicated by the solid line surrounding "AT1" in associated task domain 518.

Attribute matching context 520, exemplifies a scenario where three nodes (resource node 522, resource node 524, and resource node 526) have been determined to be relevant to task node 504 based on a determination that each of those nodes share at least one contextual attribute classification with task node 504. Thus each of resource nodes 522, 524 and 526 have been determined to be associated with an attribute that has been classified in a common contextual group as indicated by matching attributes 528, which were discussed above in relation to node attribute context 508. Upon determining that each of resource nodes 522-526 are relevant to task node 504, resources corresponding to each of those nodes and/or links to those resources may be displayed.

Figure 6:
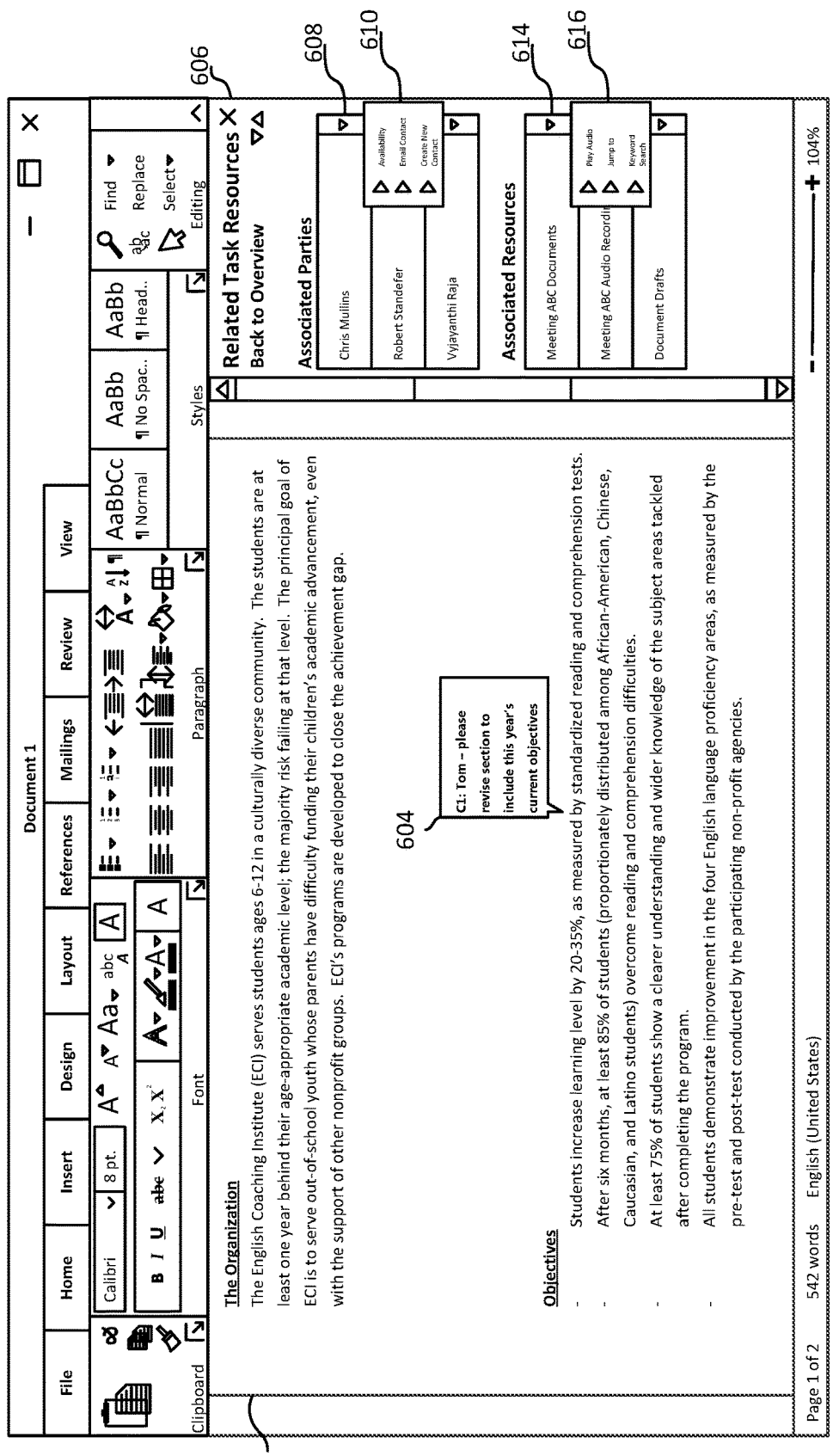
FIG. 6 illustrates an exemplary task assignment document including displayed functionality for dynamically linking tasks and resources.

FIG. 6 illustrates an exemplary task assignment document 602 in a word processing application 600 including displayed functionality for dynamically linking tasks and resources. Task assignment document 602 is illustrative of a task resource which may be analyzed and processed according to the systems and methods described herein. Specifically, one or more properties of task assignment document 602 may be analyzed and determinations may be made as to whether those properties should be classified into one or more contextual groups including an associated parties context group, a locational context group, a temporal context group, a topical context group, and an associated task context group. Upon classification of those properties into one or more contextual groups a task node may be created and attributes corresponding to those classifications may be associated with the task node.

Task assignment document 602 includes a comment 604 which indicates that a user (Tom) is being asked to update a section of task assignment document 602 to include the year's current objectives. Task assignment document 602 also includes related task resources pane 606 which may be populated after analyzing one or more nodes that have shared contextual attributes with a node representing task assignment document 602 and determining their relevance to a current task provided by task assignment document 602 and comment 604. For example, one or more nodes may have been determined to share contextual attributes with a node representing task assignment document 602 and relevant information may have been extracted from those nodes and/or their corresponding resources to populate task resources pane 606 with relevant information. In this example relevant information that has been extracted for display in task resource pane 606 includes associated parties 608 (Chris Mullins, Robert Standefer and Vyjayanthi Raja) and associated resources 614 (Meeting ABC documents, Meeting ABC Audio Recording and Document Drafts). Related task resources pane 606 may provide additional functionality as indicated by pop out window 610, which a user may utilize to check the availability of an associated party, create a draft email to an associated party and/or create a new contact for an associated party. Additional functionality may also be provided by pop out window 616, which a user may utilize in the case of an audio recording of a relevant meeting, to play back the recording directly, jump to a determined most relevant section of the recording as it relates to the current task and/or perform a keyword search for relevant information contained in the recording.

Although pop out window 616 is provided by specific example as it relates to an audio recording of a determined relevant meeting, similar functionality may be provided by pop out windows for other relevant resources. For example, a pop out window may be provided in relation to "Meeting ABC Documents" which may allow a user to open documents that relate to that meeting, jump to determined most relevant sections of those documents as they relate to a current task and/or perform keyword searching in those documents, among other functionality that may be provided by such features.

Figure 7A:
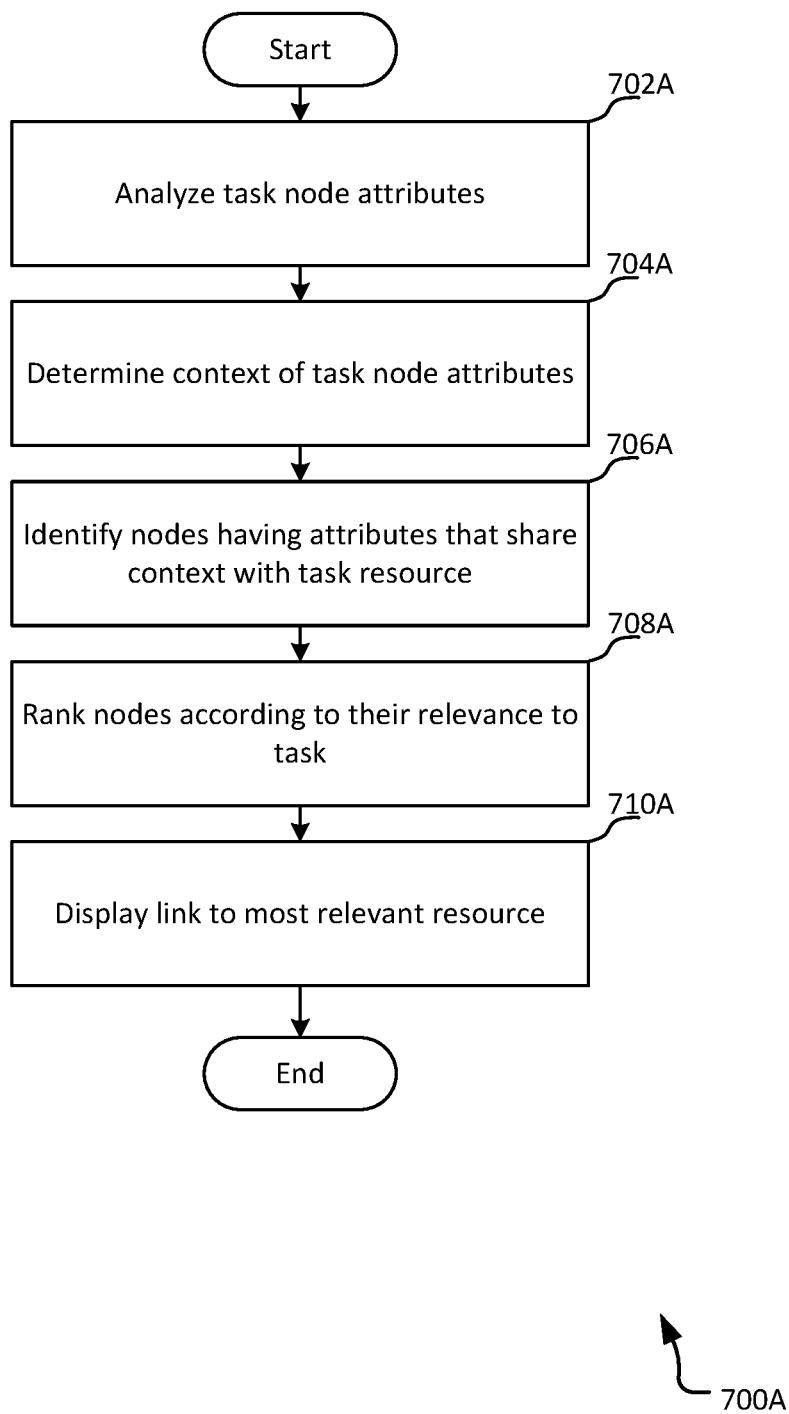
FIG. 7A illustrates an exemplary method for dynamically linking tasks and resources.

FIG. 7A illustrates an exemplary method 700A for dynamically linking tasks and resources. The method 700A begins at a start operation and continues to operation 702A where one or more attributes of a task node are analyzed. A task node may be created based on inspection and analysis performed on a resource and a determination that the resource contains one or more property indicating that a task assignment is associated with that resource (e.g., a comment in a document for a part to edit a portion of the document, an email that asks a party to perform an action, etc.). Each task node attribute is representative of a task resource property and each task node attribute represents a classification of that property into one or more groups that may be used in querying one or more Sets and returning relevant information to task completion based on such queries.

From operation 702A flow continues to operation 704A where a determination is made as to whether any of the analyzed task node attributes are categorized into a contextual group comprising one or more groups such as an associated parties context group, a locational context group, a temporal context group and a topical context group. For example, a task resource and/or one or more of its associated attributes may be categorized in an associated parties context group based on identification of one or more individuals and/or contacts that sent the task resource to a task assignee, one or more individuals and/or contacts being mentioned in the task resource or a secondary resource that accompanied the task resource, and/or one or more individuals and/or contacts being carbon copied when the task resource was sent. A task resource and/or one or more of its associated attributes may be categorized in a locational context group based on a determination that a task resource was sent from a specific geolocation, that one or more persons associated with the sending of the task resource are affiliated with a specific geolocation, that a meeting related to the task assignment took place at a specific geolocation, etc. A task resource and/or one or more of its associated attributes may be categorized in a temporal context group based on a determination that a task resource was sent at a specific time, that the specific time that a task resource was sent is within a threshold timeframe from a determined time that a meeting involving the task took place, etc. A task resource and/or one or more of its associated attributes may be categorized in a topical context group based on a determination that a task resource and/or associated content with a task resource include one or more keywords or descriptors that correspond to a specific task or task type, a specific project name or project type, a specific topic or topic type, etc.

Moving to operation 706A nodes, in the same and/or a different Set as the task node, that share one or more contextual attribute classifications with the task node are identified. For example, if a task node is identified as having an attribute such as "Person 1" classified in an associated parties context group, a second node may be identified as also having the attribute "Person 1" which has similarly been classified in an associated parties context group. If a task node is identified as having an attribute such as "Location 1" classified in a locational context group, a second node may be identified as also having the attribute "Location 1" which has similarly been classified in a locational context group. If a task node is identified as having an attribute such as "Time 1" classified in a locational context group, a second node may similarly be classified in a temporal context group if it has an associated attribute that has been identified as corresponding to a temporal threshold of "Time 1". If a task node is identified as having an attribute such as "Task Type A1" classified in a topical context group, a second node may be identified as having the attribute "Task Type A2" which has been classified in a topical context group and an associated task context group.

From operation 706A flow continues to operation 708A where nodes that share contextual attribute classification with the task node are ranked according to their relevance to a task embodied by the task node. Contextual attribute classifications may be weighted based on the contextual group that an attribute is classified in, the type of property corresponding to an attribute, the number of contextual attribute classifications that are applied to a single node, as well as the contextual group combinations represented by classified attributes for a node, for example.

From operation 708A flow continues to operation 710A where a link to a most relevant resource corresponding to a most relevant node is displayed. Although a link to a single, most relevant, resource may be displayed, additional links to less relevant nodes may also be displayed. For example, when displaying relevant task resources, a separate window may be displayed in a task assigning resource, a popup window may be displayed when an indication is received to view relevant resources, and an actionable link may be provided in a widow that directs to a corresponding resource. In addition to providing a link to a most relevant resource at operation 710A, contextual information related to a linked resource and its relevance to a current task (as embodied by the task node) may also be displayed. For example, if a link is provided to a document resource that has been determined to be relevant to a task's completion, contextual information may be displayed such as: when the document was authored, who the document was authored by, what portions of the document are likely relevant in completing the task, whether persons associated with the document are available, links to generate email shells to persons associated with the document, etc.

From operation 710A flow continues to an end operation and method 700A ends.

Figure 7B:
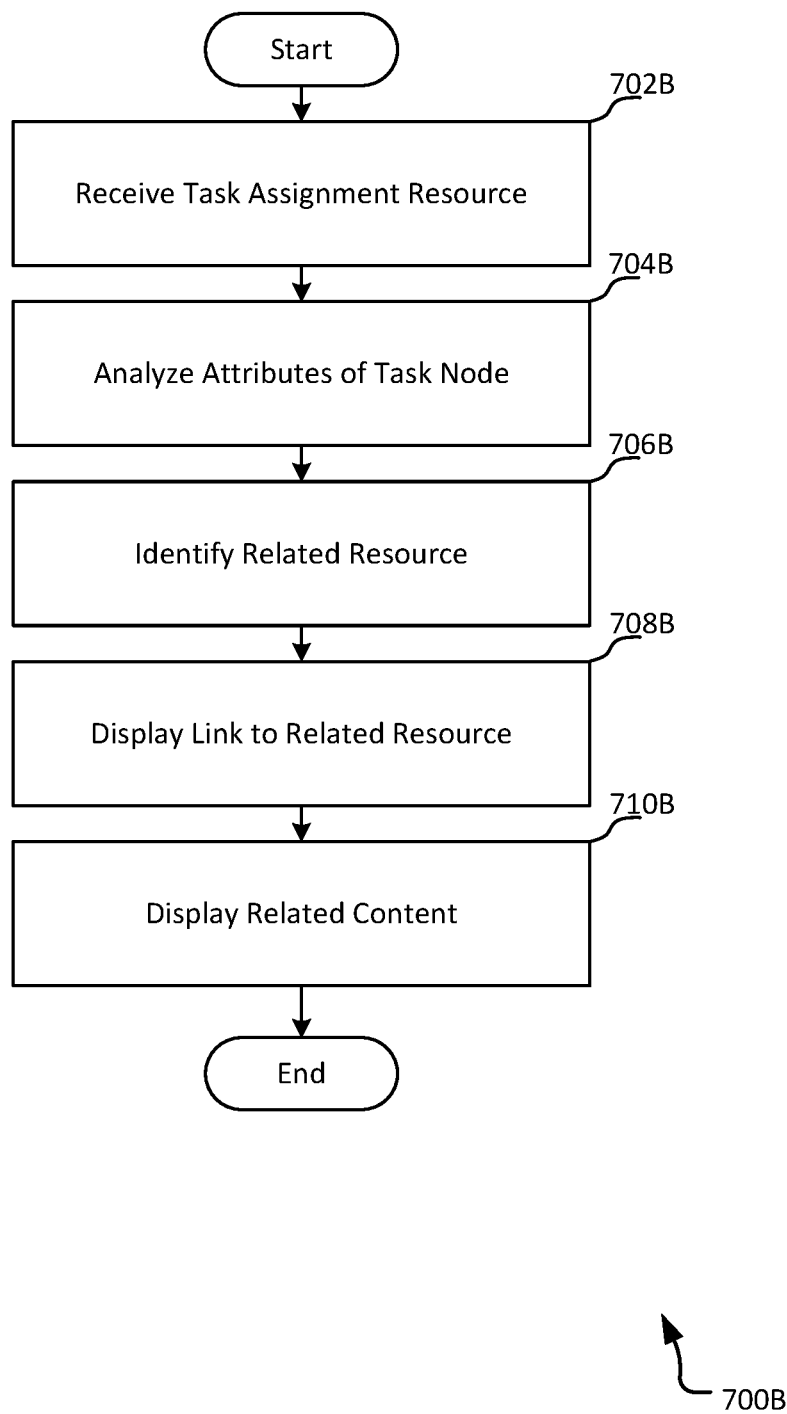
FIG. 7B illustrates an exemplary method for dynamically linking tasks and resources and providing related content useful in completing an assigned task.

FIG. 7B illustrates an exemplary method 700B for dynamically linking tasks and resources and providing related content useful in completing an assigned task. The method 700B begins at a start operation and continues to operation 702B where a task assignment resource is received. For example, a resource may be received by one or more server computing devices and one or more properties of that resource may be analyzed and classified based on their correspondence to one or more tasks. Upon determining that one or more of the properties are associated with assignment of a task, the resource may be classified as a task assignment resource and a task node may be created in a new or existing Set for each property that corresponds to an individual task for that resource. Prior or subsequent to classification of the resource as a task assignment resource, the resource may be received by a task assignee. For example, an email including a request for the task assignee to perform one or more tasks may be received and accessed via one or more computing devices associated with an account accessible by the task assignee.

From operation 702B flow continues to operation 704B where one or more attributes of a task node corresponding to the task assignment resource may be analyzed and classified into one or more contextual categories including an associated party context, a locational context, a temporal context, and a topical context.

From operation 704B flow continues to operation 706B where at least one resource related to the task assignment resource is identified. According to examples, attribute classifications (e.g., associated party context classification, locational context classification, temporal context classification, topical context classification) of the task node associated with the task assignment resource may be matched against one or more attribute classifications for one or more nodes in the same or a different Set as the task node. Upon identifying at least one node having at least two shared attribute classifications, and correspondingly two shared property classifications, a link may be provided to identified nodes and their corresponding resources that meet or exceed a relevance threshold based on a match value of their classified properties and attributes to classifications for task assignment resource properties and corresponding attribute classifications. For example, a resource that has properties that have been classified into three contexts that match context classification of three properties for a task assignment resource may have a higher match value in relation to the task assignment resource than a resource that only shares two property classifications with the task assignment resource.

From operation 706B flow continues to operation 708B where an actionable link to at least one related resource having a plurality of identified properties sharing at least two contexts associated with the plurality of properties that are associated with an assigned task are displayed. It should be understood that actionable links may be provided for a plurality of resources that meet a relevance threshold and/or a single actionable link may be provided to a most relevant resource. According to examples, the one or more actionable links may be displayed in a separate window in a task assignment resource, in a popup window associated with a task assignment resource, and/or adjacent to a portion of a task assignment resource in which a task has been assigned.

From operation 708B flow continues to operation 710B where additional content related to each of a plurality of contexts that are shared amongst the task assignment resource and the one or more related resources that actionable links are provided for is displayed. For example, if a task assignment resource has properties (e.g., "Person 1", "Person 2" and "Person 3") which have been classified in an associated party context, and property ("Time 1") which has been classified in a temporal context, and a related resource has two or more properties (e.g., "Person 1", "Person 2" and "Person 4") that have been classified in an associated party context, and property "Time 1") which has been classified in a temporal context, content related to each of Person 1, Person 2, Person 3, and Person 4 may be displayed in association with the task assignment resource. For example, information related to the schedule and availability of each of those persons, the location of those persons, content in the task assignment resource generated by those persons, meetings that those persons were present at in which the task assignment resource was discussed or used as a demonstrative, etc., may be displayed in or adjacent to the task assignment resource. Further, because the task assignment resource and the related resource share a common temporal property (i.e., "Time 1"), related content associated with that shared temporal property may be displayed more instead of, or in a more prominent manner than, related content that is not associated with the shared temporal property.

From operation 710B flow continues to an end operation and the method 700B ends.

Figure 8:
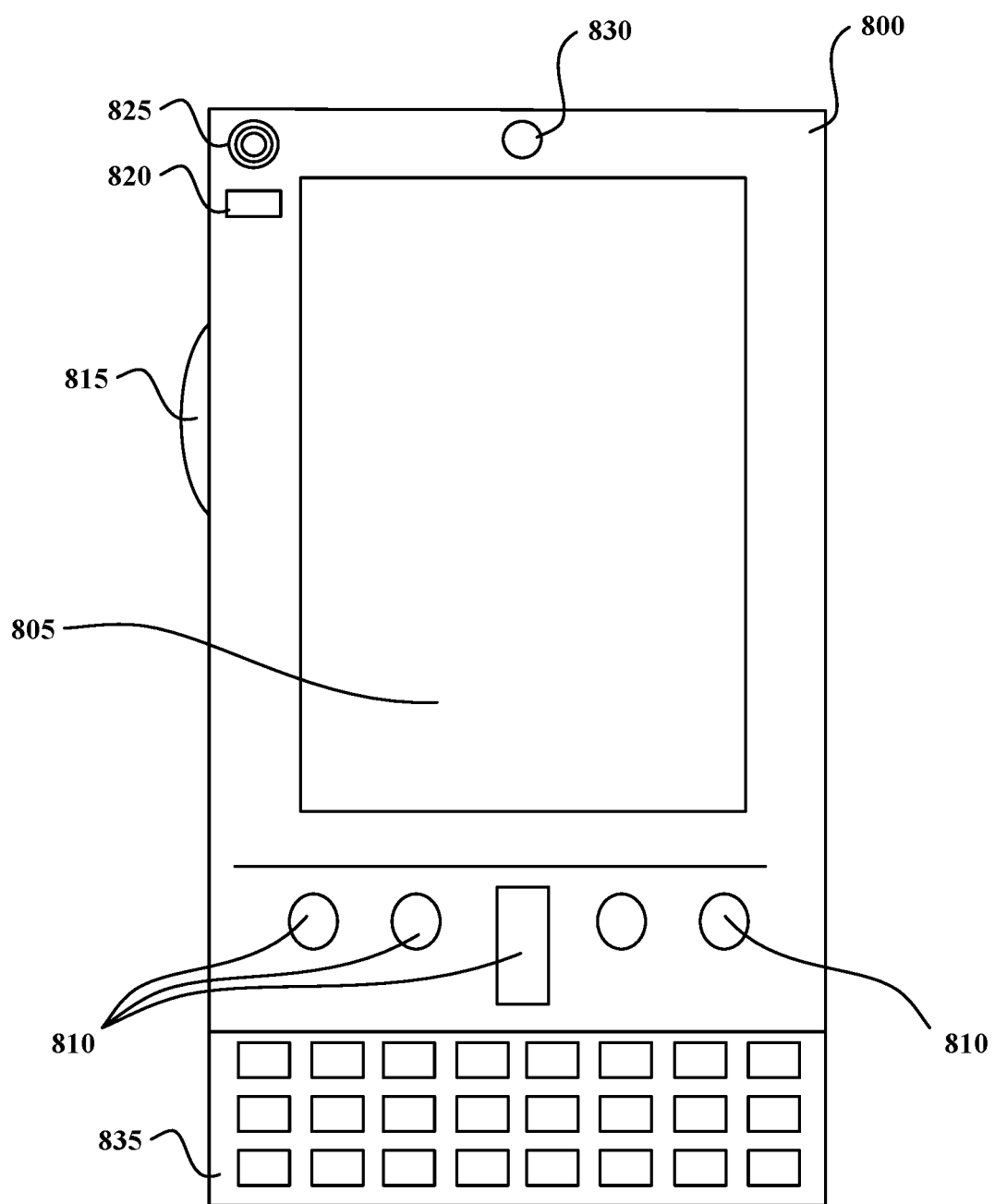
FIG. 8 illustrates a computing device for executing one more aspects of the present disclosure.
Figure 9:
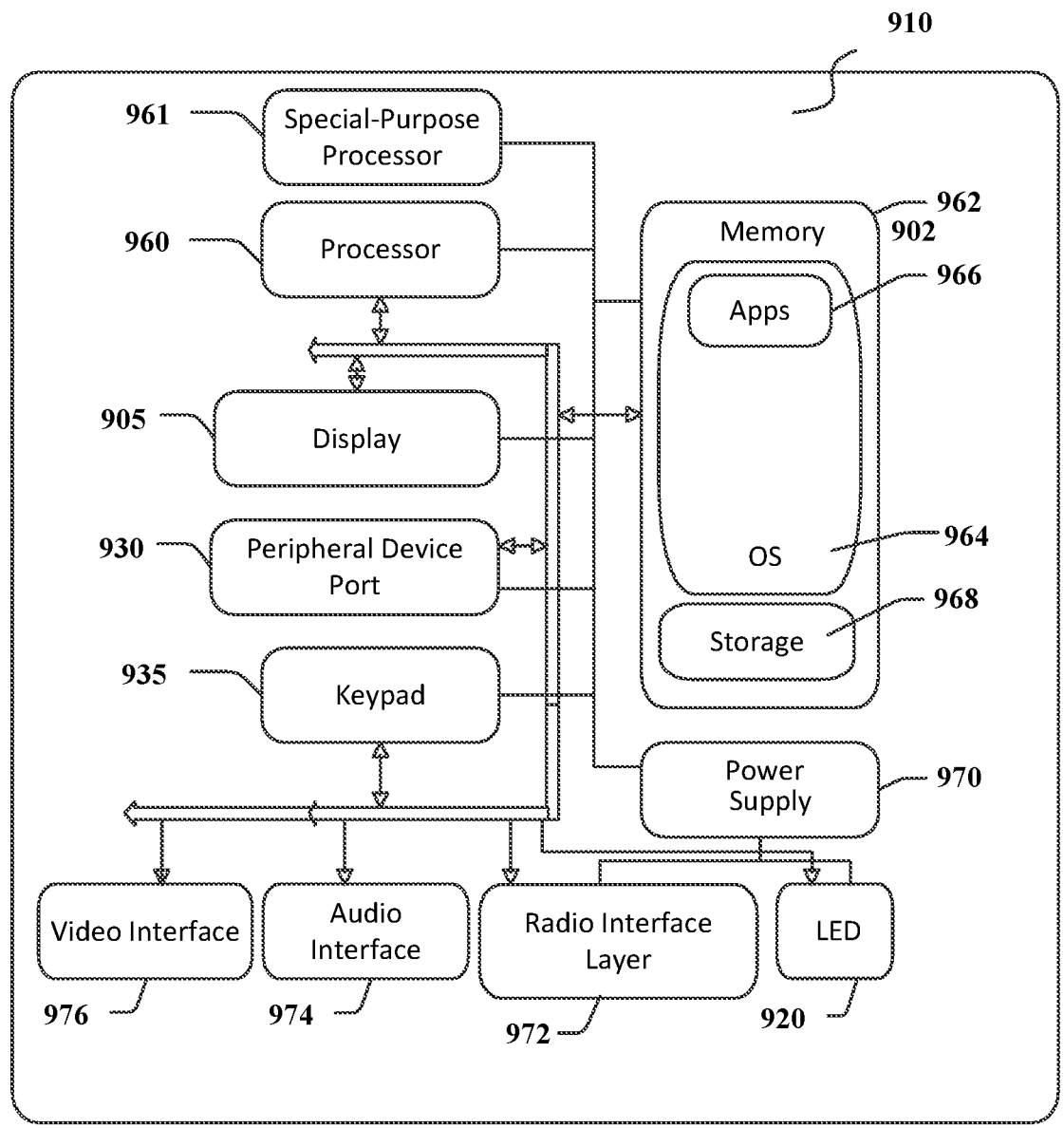
FIG. 9 is a simplified block diagram of a computing device with which aspects of the present disclosure may be practiced.

FIG. 8 and FIG. 9 illustrate computing device 800, for example, a mobile telephone, a smart phone, a tablet personal computer, a laptop computer, and the like, with which embodiments of the disclosure may be practiced. With reference to FIG. 8, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode) and/or an audio transducer 825 (e.g., a speaker). In some embodiments, the mobile computing device 800 incorporates a vibration transducer for providing the user with tactile feedback. In yet another embodiments, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 805.

FIG. 9 is a block diagram illustrating the architecture of one embodiment of a mobile computing device. That is, the mobile computing device 900 can incorporate a system (i.e., an architecture) 902 to implement some aspects of the disclosure. In one aspect the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and a wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, diagramming applications, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored in the host computer. As should be appreciated, other applications may be loaded into the memory 962 and run on the mobile computing device 900, including steps and methods for providing personalized feedback from voice analysis and other user input.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the functions of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa. The radio 972 allows the system 902 to communicate with other computing devices such as over a network. The radio 972 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 902 provides notifications using the visual indicator 820 that can be used to provide visual notifications and/or an audio interface 974 producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 902 may vary and may include more or fewer components than those described in FIG. 9. In some examples, interfacing between components of the system 902 may occur remotely, for example where components of system 902 may be spread across one or more devices of a distributed network. In examples, one or more data stores/storages or other memory are associated with system 902. For example, a component of system 902 may have one or more data storages/memories/stores associated therewith. Data associated with a component of system 902 may be stored thereon as well as processing operations/instructions executed by a component of system 902.

Figure 10:
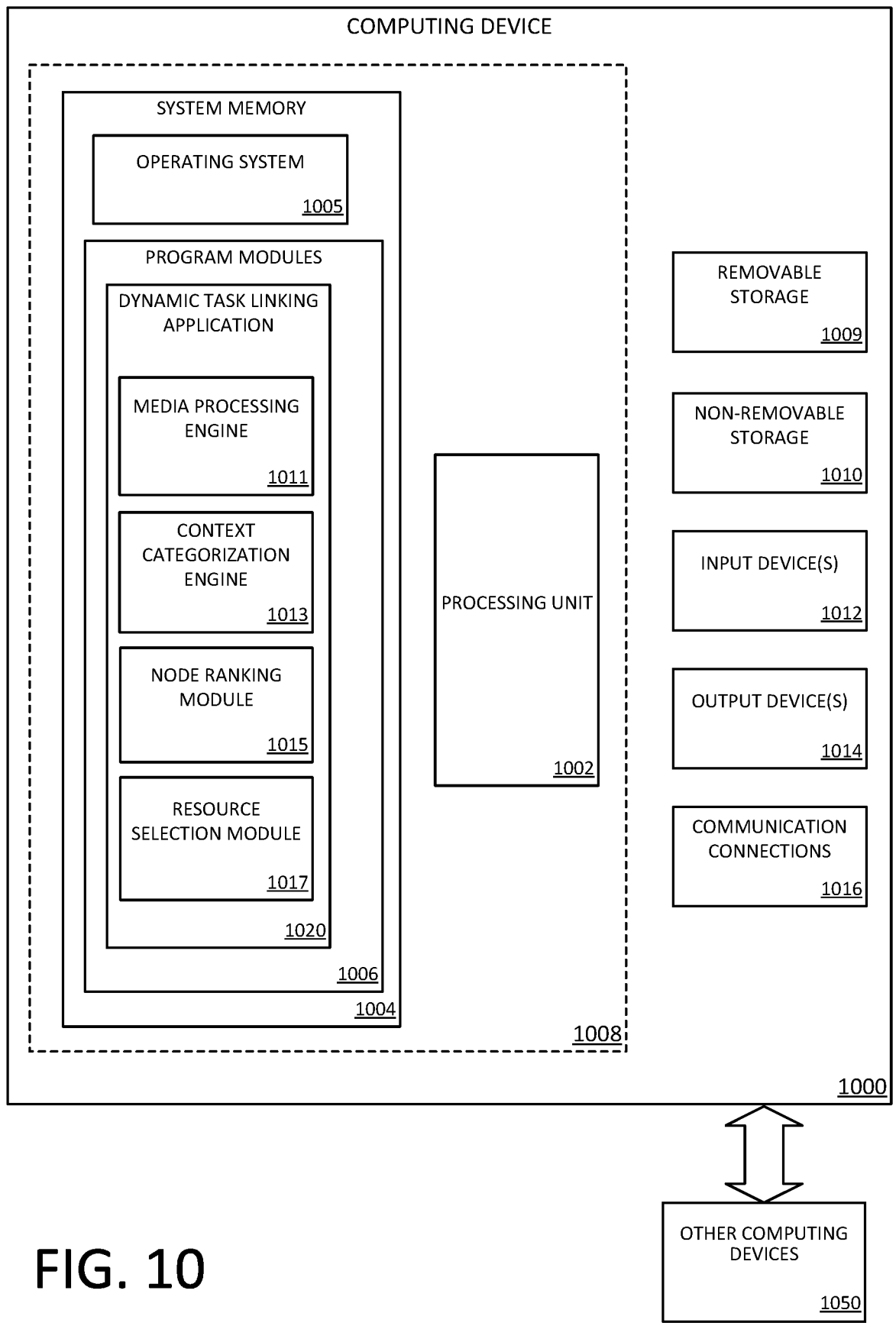
FIG. 10 is a block diagram illustrating physical components (e.g., hardware) of a computing device 1000 with which aspects of the present disclosure may be practiced.

FIG. 10 is a block diagram illustrating physical components (e.g., hardware) of a computing device 1000 with which aspects of the disclosure may be practiced. The computing device components described below may have computer executable instructions for analyzing a plurality of attributes associated with a task resource; determining a plurality of contexts that are associated with the plurality of attributes, the plurality of contexts selected from a context group comprising: an associated parties context, a locational context, a temporal context, and a topical context; identifying at least one resource node related to the assigned task, the at least one resource node having a plurality of identified attributes sharing at least two contexts associated with the plurality of attributes that are associated with the assigned task; and causing, on a graphical user interface, an actionable link to the at least one identified resource to be displayed.

In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for dynamic task linking application 1020, such as one or more components in regards to FIG. 10 and, in particular, media processing engine 1011, context categorization engine 1013, node ranking module 1015 and resource selection module 1017. For example, media processing engine 1011 may perform one or more operations related to the extraction and processing of information as it relates to one or more contextual categories (e.g., language processing, optical character recognition, etc.). Context categorization engine 1013 may perform one or more operations related to classification of one or more identified properties of a resource and categorization of those properties into attribute context categories such as an associated party context, a locational context, a temporal context, a topical context and an associated task context. Node ranking module 1015 may perform operations that evaluate classified attributes of a task resource node for their correspondence to one or more additional nodes having matching attribute classifications. Resource selection module 1017 may perform one or more operations in identifying resources that may be helpful in completing a task assigned through a task assignment resource by, for example, identifying relationships amongst attributes of a task node and one or more additional nodes.

The operating system 1005, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., dynamic task linking application 1020) may perform processes including, but not limited to, the aspects, as described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 1004. While executing on processing unit 1002, program modules (e.g., applications, Input/Output (I/O) management, and other utilities) may perform processes including, but not limited to, one or more of the operational stages of the methods described herein.

Figure 11:
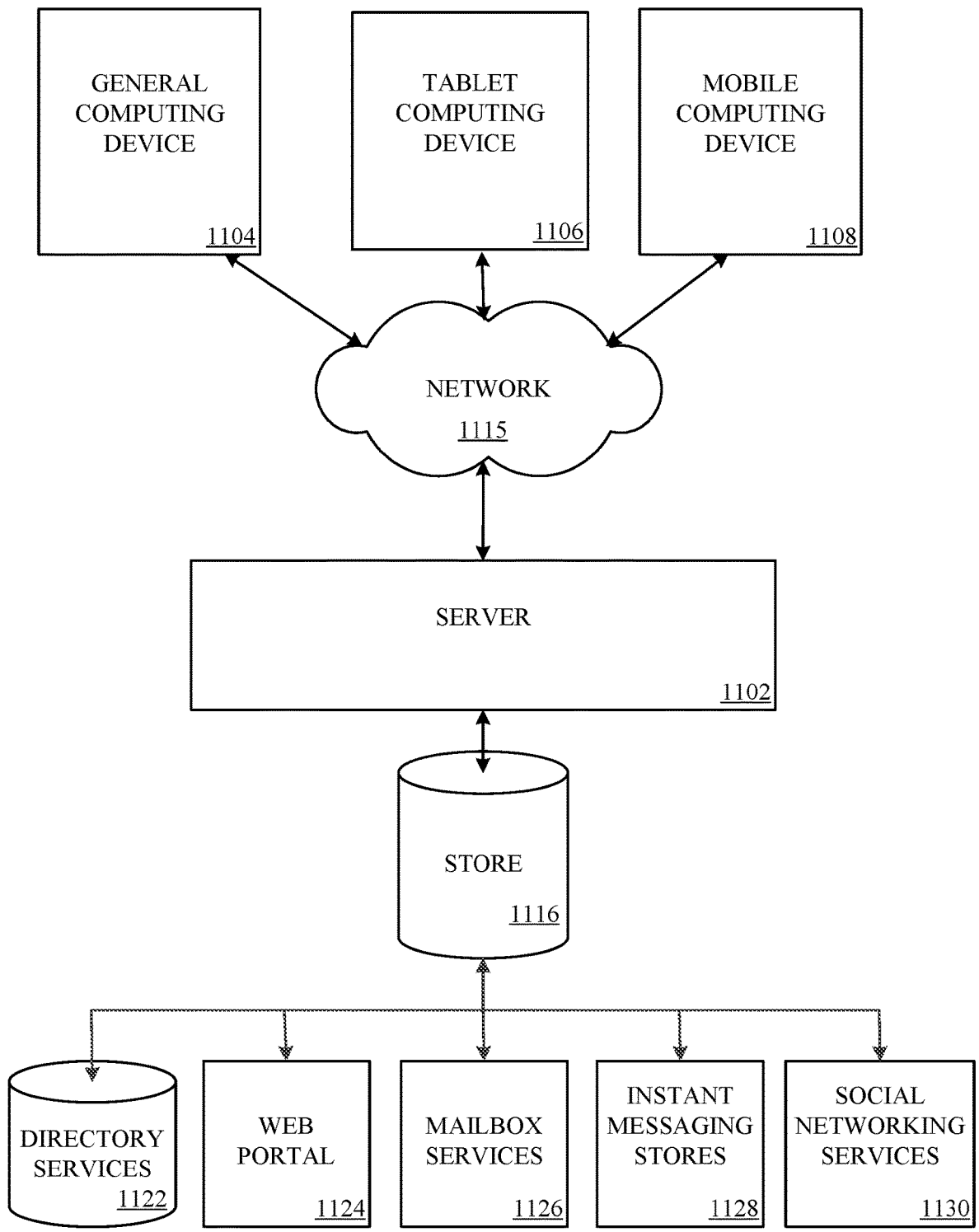
FIG. 11 is a schematic diagram illustrating an example distributed computing environment for dynamically linking tasks and resources.

FIG. 11 illustrates one example of the architecture of a system for dynamically linking tasks and resources as described herein. User input may be accessed, interacted with, or edited in association with programming modules 1006 and storage/memory which may be stored in different communication channels or other storage types. For example, various documents may be stored using a directory service 1122, a web portal 1124, a mailbox service 1126, an instant messaging store 1128, or a social networking site 1130, application 1006, an IO manager, other utilities and storage systems may use any of these types of systems or the like for enabling data utilization, as described herein. A server 1102 may provide a storage system for use by a client operating on a general computing device 1104 and mobile computing devices 1106 through network 1115. According to examples, a task assignment resource may be generated on general computing device 1104 and accessed by a task assignee via one or more mobile computing device 1106. One or more nodes, such as a task node corresponding to the task assignment resource, and their corresponding attributes and contextual attribute classifications may be stored on server 1102 and relationships amongst nodes having matching attribute classifications may be identified by processing performed by server 1102. According to additional examples, network 1115 may comprise the Internet or any other type of local or wide area network, and client nodes may be implemented as a computing device embodied in a personal computer, a tablet computing device 1106, and/or by a mobile computing device 1108 (e.g., mobile processing device). Any of these examples of the computing devices described herein may obtain content from the store 1116.

As will be understood from the foregoing disclosure, one aspect of the technology relates to A method for dynamically linking tasks and resources, comprising: analyzing a plurality of attributes associated with a task resource; determining a plurality of contexts that are associated with the plurality of attributes, the plurality of contexts selected from a context group comprising: an associated parties context, a locational context, a temporal context, and a topical context; identifying at least one resource node related to the task resource, the at least one resource node having a plurality of identified attributes sharing at least two contexts associated with the plurality of attributes that are associated with the task resource; and causing, on a graphical user interface, an actionable link to at least one resource corresponding to the at least one identified resource to be displayed. In an example, a most relevant resource node having a plurality of identified attributes sharing at least two contexts associated with the plurality of attributes that are associated with the task resource may be identified. According to another example, identifying the most relevant resource node comprises: identifying a resource node having a highest number of attributes associated with the task resource. According to other examples, identifying the most relevant resource comprises: identifying a resource node having a highest number of attributes sharing at least two contexts associated with the plurality of attributes that are associated with the task resource. According to yet other examples, the actionable link provides direction to a specific location of the at least one identified resource, the specific location related to creation of an assigned task. In another example, a relational trail from the at least one identified resource to the assigned task may be displayed on the graphical user interface. In some examples, the topical context is identified from data extracted from the plurality of attributes associated with the task resource and machine classification of that data based on keyword identification. In another example, machine classification of the extracted data further comprises: identifying at least one keyword from data extracted from a plurality of attributes associated with one or more nodes related to the task node, the at least one keyword relating to a task type identified for the task node. In still further examples, the one or more nodes related to the task node have identified attributes corresponding to at least one additional task that is related the task node. In other examples, the locational context comprises a categorization of data extracted from resources comprising locational coordinate data and geocoding of that locational coordinate data to identify at least one geographical location for categorization in a locational context hierarchy. According to other examples, the temporal context comprises a categorization of data extracted from resources comprising time stamps associated with the creation of a task. In another example, the temporal context further comprises a categorization of data extracted from resources comprising time stamps associated with the periods within the resources at which a task is referenced. In further examples, the associated parties context further comprises a categorization of party information for each party that is determined to have been present during a meeting in which a task was created. In another example, the associated parties context further comprises a categorization of party information for each party that is determined to have been included in an inter-party communication related a task being created.

In another aspect, the technology relates to a system for dynamically extending a federated graph, comprising: a memory for storing executable program code; and a processor, functionally coupled to the memory, the processor being responsive to computer-executable instructions contained in the program code and operative to: analyze a plurality of properties associated with a task assigning resource; determine a plurality of contexts that are associated with the plurality of properties, the plurality of contexts selected from a context group comprising: an associated parties context, a locational context, a temporal context, and a topical context; identify at least one resource related to the assigned task, the at least one resource having a plurality of identified properties sharing at least two contexts associated with the plurality of properties that are associated with the assigned task; and cause, on a graphical user interface, an actionable link to the at least one identified resource to be displayed. In some examples the processor is further responsive to the computer-executable instructions and operative to: receive input to filter the at least one identified resource according to one of the determined context groups for each of the plurality of identified properties of the at least one identified resource; and cause, on the graphical user interface, each of the at least one identified resources for the context group, to be displayed. In yet other examples, the topical context is identified from data extracted from the plurality of properties associated with the task assigning resource and machine classification of that data based on keyword identification.

In another aspect, the technology relates to a method for dynamically linking tasks and resources, comprising: receiving a resource having a plurality of properties associated with the assignment of a task; displaying an actionable link to at least one resource having a plurality of identified properties sharing at least two contexts associated with the plurality of properties that are associated with the assigned task, the plurality of contexts selected from a group comprising: an associated parties context, a locational context, a temporal context, and a topical context; and displaying additional content related to each of the plurality contexts that are shared amongst the plurality of identified resource properties and the plurality of properties that are associated with the assigned task. According to some examples, the additional content is accessible via a dropdown menu adjacent to each displayed actionable link for each of the shared plurality of contexts. In a further example, the additional content is an interactive list of persons associated with the assigned task.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for dynamically linking tasks and resources, comprising:

analyzing a plurality of attributes associated with a task resource;

determining a plurality of contexts that are associated with the plurality of attributes, the plurality of contexts selected from a context group comprising: an associated parties context, a locational context, a temporal context, and a topical context;

identifying a first resource node related to the task resource, the first resource node having a plurality of identified attributes sharing at least two contexts associated with the plurality of attributes that are associated with the task resource;
automatically generating a first actionable link to the first resource corresponding to the first identified resource to be displayed;
identifying a second resource node related to the task resource, the second resource node having a plurality of identified attributes sharing at least two contexts associated with the plurality of attributes that are associated with the task resource;
automatically generating a second actionable link to the second resource node corresponding to the second identified resource to be displayed; and
automatically displaying the first link and the second link in a list in a graphical user interface associated with the task resource, wherein the first link is displayed higher in the list than the second link due to the first resource node having a stronger relationship to the task resource than the second resource node, wherein the stronger relationship is determined by a match value that calculates a number of attribute classifications of the first resource that match property classifications of the task resource.

2. The method of claim 1, further comprising identifying a most relevant resource node having a plurality of identified attributes sharing at least two contexts associated with the plurality of attributes that are associated with the task resource.

3. The method of claim 2, wherein identifying the most relevant resource node comprises:
identifying a resource node having a highest number of attributes associated with the task resource.

4. The method of claim 1, wherein identifying the most relevant resource comprises:
identifying a resource node having a highest number of attributes sharing at least two contexts associated with the plurality of attributes that are associated with the task resource.

5. The method of claim 1, wherein the actionable link provides direction to a specific location of the at least one identified resource, the specific location related to creation of an assigned task.

6. The method of claim 1, further comprising:
displaying, on the graphical user interface, a relational trail from the at least one identified resource to the assigned task.

7. The method of claim 1, wherein the topical context is identified from data extracted from the plurality of attributes associated with the task resource and machine classification of that data based on keyword identification.

8. The method of claim 7, wherein machine classification of the extracted data further comprises:
identifying at least one keyword from data extracted from a plurality of attributes associated with one or more nodes related to the task node, the at least one keyword relating to a task type identified for the task node.

9. The method of claim 8, wherein the one or more nodes related to the task node have identified attributes corresponding to at least one additional task that is related to the task node.

10. The method of claim 1, wherein the locational context comprises a categorization of data extracted from resources comprising locational coordinate data and geocoding of that locational coordinate data to identify at least one geographical location for categorization in a locational context hierarchy.

11. The method of claim 1, wherein the temporal context comprises a categorization of data extracted from resources comprising time stamps associated with the creation of a task.

12. The method of claim 11, wherein the temporal context further comprises a categorization of data extracted from resources comprising time stamps associated with the periods within the resources at which a task is referenced.

13. The method of claim 1, wherein the associated parties context further comprises a categorization of party information for each party that is determined to have been present during a meeting in which a task was created.

14. The method of claim 1, wherein the associated parties context further comprises a categorization of party information for each party that is determined to have been included in an inter-party communication related a task being created.

15. A system for dynamically extending a federated graph, comprising:
a memory for storing executable program code;
a processor, functionally coupled to the memory, the processor being responsive to computer-executable instructions contained in the program code and operative to:
analyze a plurality of properties associated with a task assigning resource;
determine a plurality of contexts that are associated with the plurality of properties, the plurality of contexts selected from a context group comprising: an associated parties context, a locational context, a temporal context, and a topical context;
identify a first resource related to the assigned task, the first resource having a plurality of identified properties sharing at least two contexts associated with the plurality of properties that are associated with the assigned task;
automatically generating a first actionable link to the first resource to be displayed;
identifying a second resource related to the assigned task, the second resource having a plurality of identified properties sharing at least two contexts associated with the plurality of properties that are associated with the assigned task;
automatically generating a second actionable link to the second resource corresponding to the second resource to be displayed; and
automatically displaying the first link and the second link in a list in a graphical user interface associated with the task resource, wherein the first link is displayed higher in the list than the second link due to the first resource having a stronger relationship to the task resource than the second resource, wherein the stronger relationship is determined by a match value that calculates a number of attribute classifications of the first resource that match property classifications of the task resource.

16. The system of claim 15, wherein the processor is further responsive to the computer-executable instructions and operative to:
receive input to filter the at least one identified resource according to one of the determined context groups for each of the plurality of identified properties of the at least one identified resource; and
cause, on the graphical user interface, each of the at least one identified resources for the context group, to be displayed.

17. The system of claim 15, wherein the topical context is identified from data extracted from the plurality of properties associated with the task assigning resource and machine classification of that data based on keyword identification.

18. A method for dynamically linking tasks and resources, comprising:

receiving a first resource having a plurality of properties associated with the assignment of a task;

receiving a second resource having a plurality of properties associated with the assignment of a task;

automatically generating a first actionable link to the first resource having a plurality of identified properties sharing at least two contexts associated with the plurality of properties that are associated with the assigned task, the plurality of contexts selected from a group comprising: an associated parties context, a locational context, a temporal context, and a topical context;

automatically generating a second actionable link to the second resource having a plurality of identified properties sharing at least two contexts associated with the plurality of properties that are associated with the assigned task, the plurality of contexts selected from a group comprising: an associated parties context, a locational context, a temporal context, and a topical context; and automatically displaying the first link and the second link in a list in a graphical user interface associated with the task resource, wherein the first link is displayed higher in the list than the second link due to the first resource having a stronger relationship to the task resource than the second resource, wherein the stronger relationship is determined by a match value that calculates a number of attribute classifications of the first resource that match property classifications of the task resource.

19. The method of claim 18, wherein the additional content is accessible via a dropdown menu adjacent to each displayed actionable link for each of the shared plurality of contexts.

20. The method of claim 19, wherein the additional content is an interactive list of persons associated with the assigned task.

* * * * *